United States Patent
Schoonover et al.

(10) Patent No.: US 7,726,467 B1
(45) Date of Patent: Jun. 1, 2010

(54) CONVEYOR COUPLER SYSTEM

(76) Inventors: Albert G. Schoonover, 1023 West Ave. B, Bismarck, ND (US) 58501-2407; Gordon L. Schoonover, 721 79th Ave. Northeast, Bismarck, ND (US) 58503

( * ) Notice: Subject to any disclaimer, the term of this patent is extended or adjusted under 35 U.S.C. 154(b) by 186 days.

(21) Appl. No.: 11/684,536

(22) Filed: Mar. 9, 2007

(51) Int. Cl.
B65G 23/00 (2006.01)
B65G 23/14 (2006.01)
B65G 23/06 (2006.01)
B65G 23/04 (2006.01)
F16H 47/00 (2006.01)
F16C 3/00 (2006.01)
F16D 1/00 (2006.01)

(52) U.S. Cl. .................. 198/618; 198/832; 198/833; 198/834; 198/835; 198/576; 464/182; 74/650; 74/335; 403/375

(58) Field of Classification Search .............. 198/832, 198/834–835; 464/182; 403/161, 163, 1; 74/650, 335
See application file for complete search history.

(56) References Cited

U.S. PATENT DOCUMENTS

| | | | | |
|---|---|---|---|---|
| 1,613,132 A | * | 1/1927 | Rosener | 493/52 |
| 2,802,555 A | * | 8/1957 | Kalikow | 192/24 |
| 3,289,819 A | * | 12/1966 | Steinmetz | 198/666 |
| 4,396,110 A | * | 8/1983 | Christensen | 198/576 |
| 5,150,637 A | * | 9/1992 | Ninomiya et al. | 74/335 |
| 5,983,754 A | * | 11/1999 | Tyson et al. | 74/650 |
| 2007/0202980 A1 | * | 8/2007 | Hur et al. | 475/154 |

OTHER PUBLICATIONS

Access, EarthWORKS Machinery Company, Catalog, Aug. 2005, p. 13.
Access, Sulley & Son's Enterprises, Catalog, Aug. 2005, p. 14.
Access, Rock Systems, Inc., Catalog, Date Unknown.
Access, Inter-Mountain Construction, Catalog, Date Unknown.
Contractors Hot Line, Astec companies, Magazine, Jan. 7, 2005. p. 13.

* cited by examiner

Primary Examiner—Gene Crawford
Assistant Examiner—Yolanda Cumbess
(74) Attorney, Agent, or Firm—Neustel Law Offices

(57) ABSTRACT

A conveyor coupler system for efficiently increasing the longevity and productivity of the conveyor. The conveyor coupler system generally includes a coupler including a first portion and a second portion, wherein the first portion extends from the second portion. The first portion includes a first connecting portion, wherein the first connecting portion extends within the first portion and includes at least one slot. The second portion includes a second connecting portion extending within the second portion and including a plurality of ridge members. The first connecting portion connects to a first planetary gear structure of a conveyor unit and the second connecting portion connects to a second planetary gear structure of the conveyor unit.

16 Claims, 8 Drawing Sheets

CONVEYOR COUPLER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to aggregate material conveyors and more specifically it relates to a conveyor coupler system for efficiently increasing the longevity and productivity of the conveyor.

2. Description of the Related Art

Any discussion of the prior art throughout the specification should in no way be considered as an admission that such prior art is widely known or forms part of common general knowledge in the field.

Aggregate material conveyors have been in use for years. Typically, aggregate material conveyors or apron feeders are utilized in transporting aggregate material (i.e. sand, gravel, etc.) from a stationary pile to a vehicle, wherein the vehicle transports the aggregate material away for use. Because of the large amounts of aggregate material generally needed to be conveyed at one time, the conveyors are generally very large in size.

Many methods have been utilized to circulate the track or belt mechanism upon the conveyor, wherein one common method is to utilize a plurality of specially manufactured sprockets to drive a chain link assembly mechanism. These sprockets generally require large amounts of maintenance to keep in working order. It may also be difficult to find replacement parts when needed, because these sprockets are not utilized in a wide variety of industry. Because of the general lack of efficiency and practicality in the prior art there is the need for a new and improved conveyor coupler system for efficiently increasing the longevity and productivity of the conveyor.

BRIEF SUMMARY OF THE INVENTION

The general purpose of the present invention is to provide a conveyor coupler system that has many of the advantages of the aggregate material conveyors mentioned heretofore. The invention generally relates to an aggregate material conveyor which includes a coupler including a first portion and a second portion, wherein the first portion extends from the second portion. The first portion includes a first connecting portion, wherein the first connecting portion extends within the first portion and includes at least one slot. The second portion includes a second connecting portion extending within the second portion and including a plurality of ridge members. The first connecting portion connects to a first planetary gear structure of a conveyor unit and the second connecting portion connects to a second planetary gear structure of the conveyor unit.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a conveyor coupler system for efficiently increasing the longevity and productivity of the conveyor.

Another object is to provide a conveyor coupler system that is easily maintained.

An additional object is to provide a conveyor coupler system that utilizes standard and easy to find parts.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
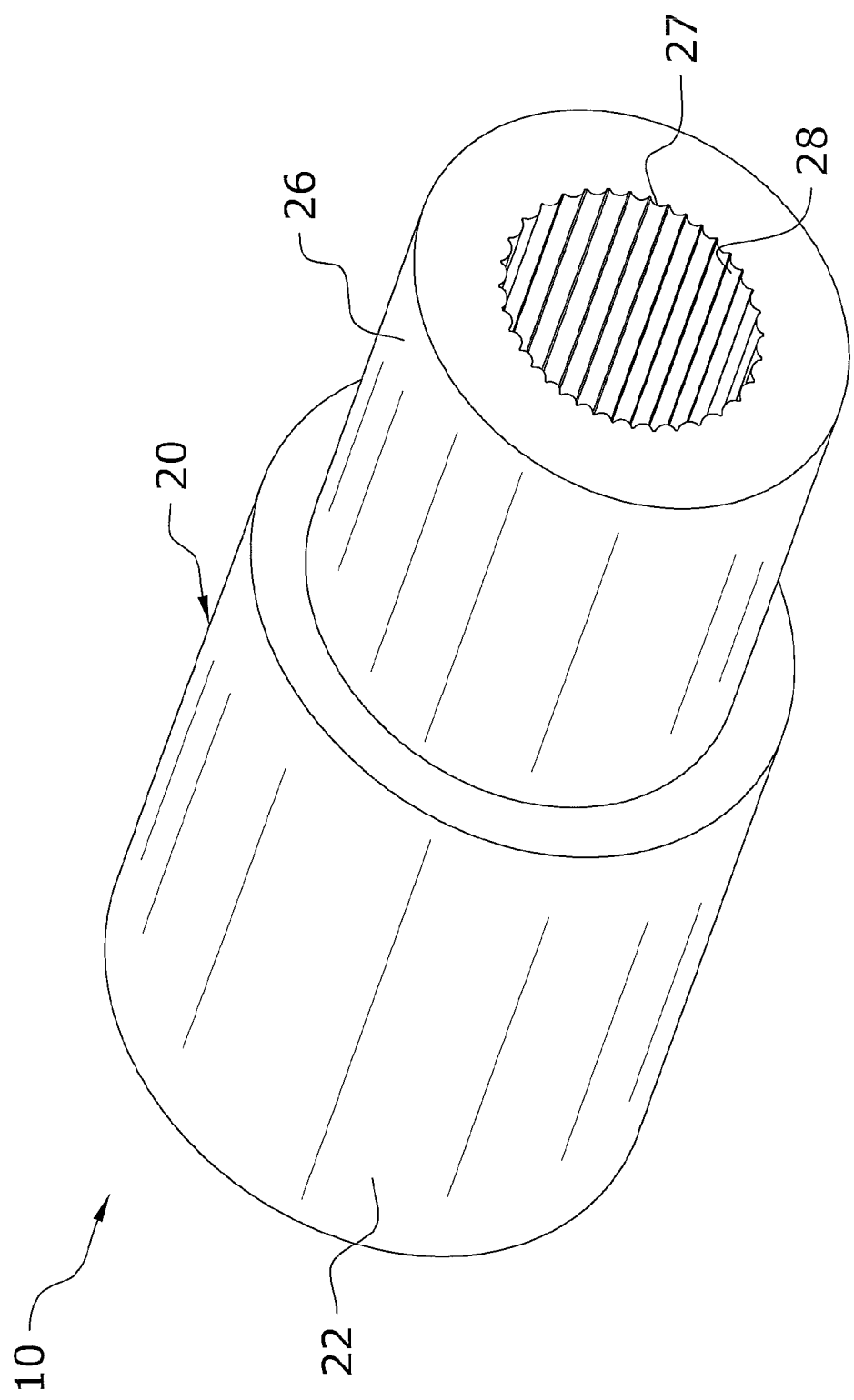
FIG. 1 is an upper perspective view of the present invention from a first direction.

Turning now descriptively to the drawings, in which similar reference characters denote similar elements throughout the several views, FIGS. 1 through 8 illustrate a conveyor coupler system 10, which comprises a coupler 20 including a first portion 22 and a second portion 26, wherein the first portion 22 extends from the second portion 26. The first portion 22 includes a first connecting portion, wherein the first connecting portion extends within the first portion 22 and includes at least one slot 24. The second portion 26 includes a second connecting portion extending within the second portion 26 and including a plurality of ridge members 28. The first connecting portion connects to a first planetary gear 30 structure of a conveyor unit 12 and the second connecting portion connects to a second planetary gear structure 50 of the conveyor unit 12.

B. Conveyer Unit

Figure 8:
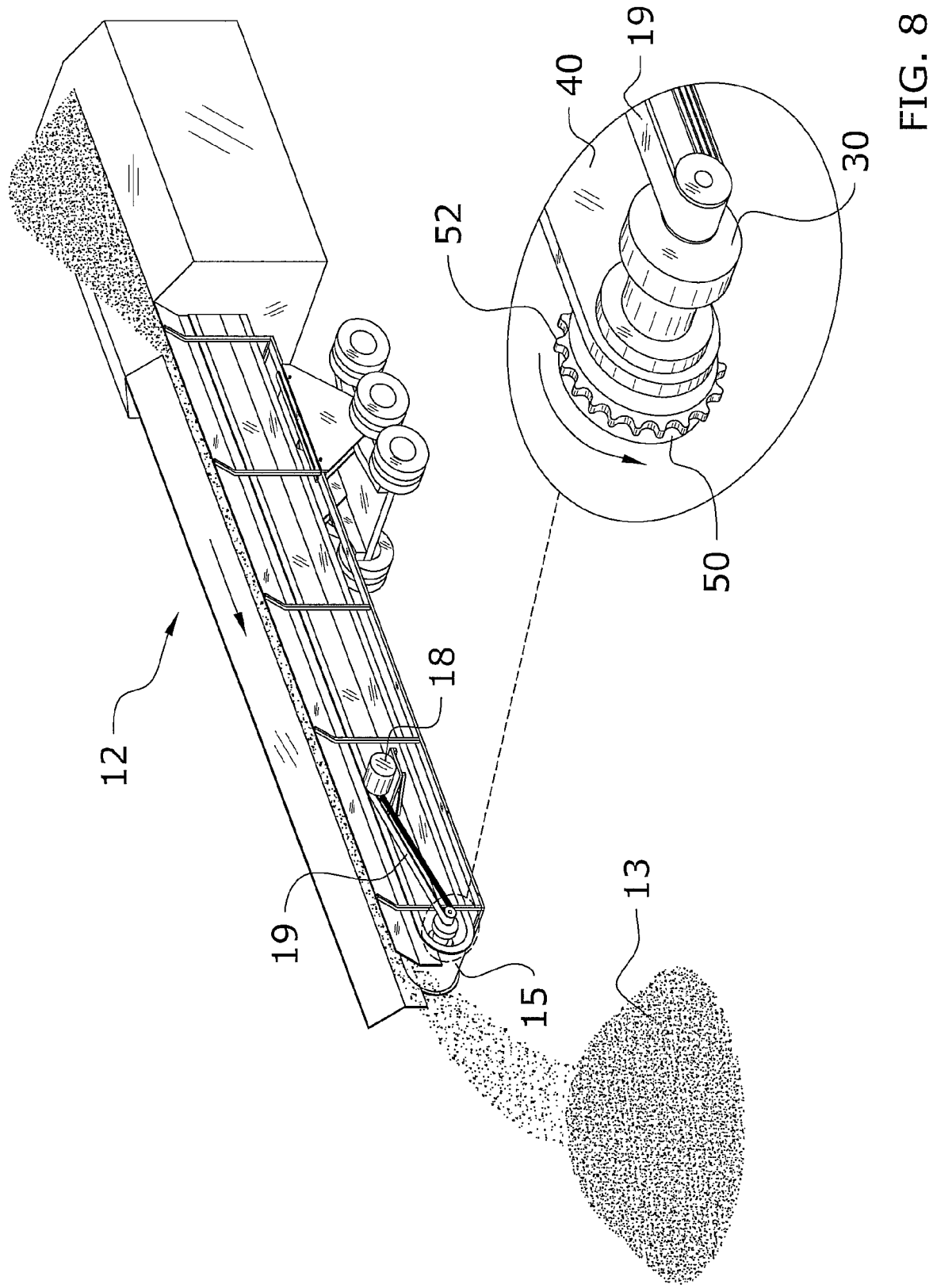
FIG. 8 is an upper perspective view of the present invention in use, with the first planetary gear structure and the connected second planetary gear structure magnified.

The conveyor unit 12 utilized with the present invention is preferably comprised of a standard aggregate material conveyor unit 12 commonly utilized in conveying aggregate material 13 (i.e. gravel, sand, rocks, etc.) from a stationary pile or point to a vehicle, wherein the vehicle generally transports the aggregate material 13 to a place of use. The conveyor unit 12 may be comprised of a configuration that is drivable or the conveyor unit 12 may be comprised of a configuration to be pulled or pushed by a separate vehicle. The conveyor unit 12 is also preferably comprised of a large and heavy duty conveyor unit 12 to handle large amounts of aggregate material 13 as shown in FIG. 8. It is appreciated that the conveyor unit 12 utilized with the present invention may transport various materials, rather than aggregate materials 13.

Figure 7:
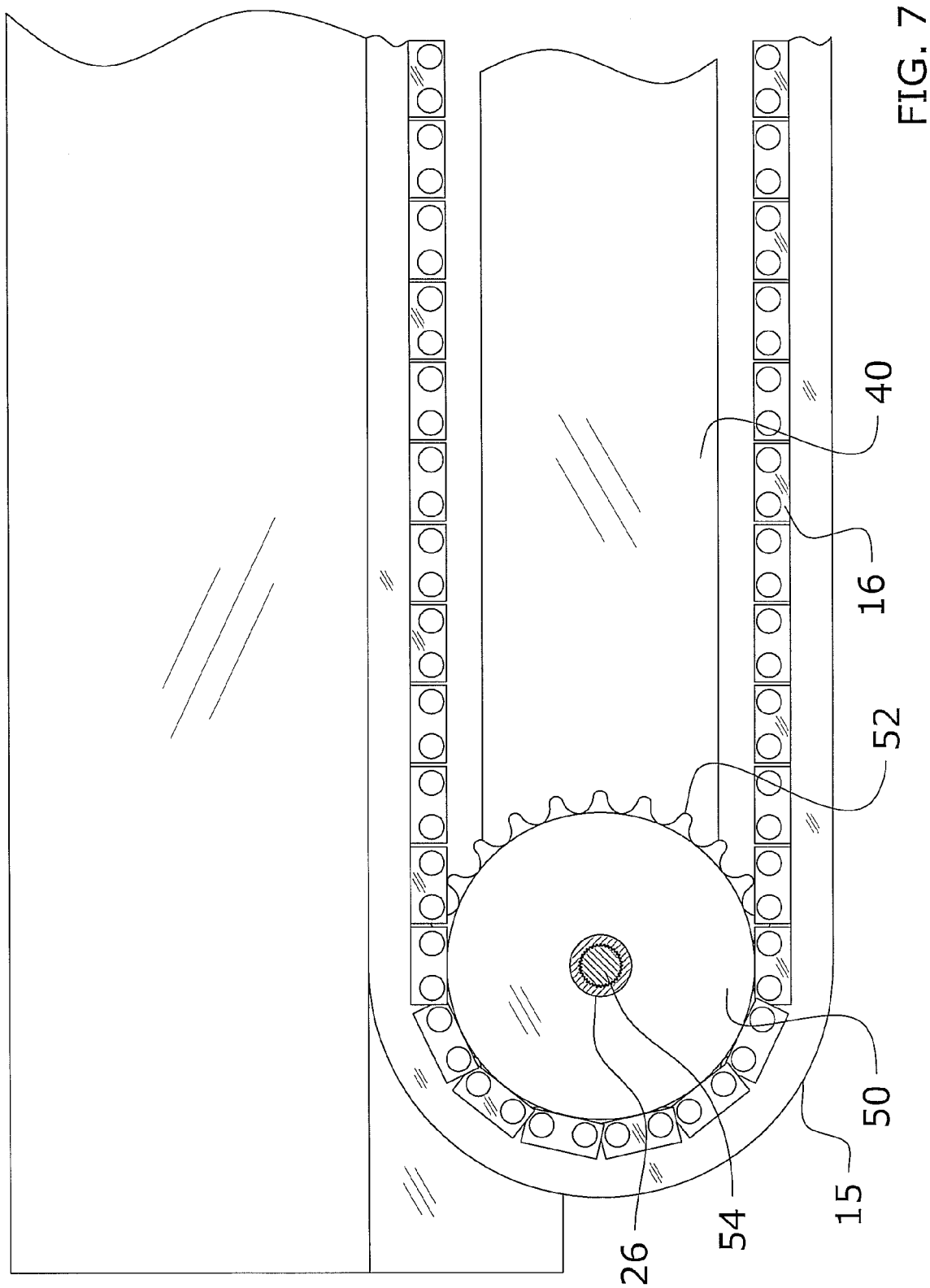
FIG. 7 is a side sectional view of the coupler looking towards the second planetary gear structure, attached chain link assembly and conveyer portion.

The conveyor unit 12 includes a conveying portion 15, wherein the conveying portion 15 circulates about the conveyor unit 12 and transports the aggregate material 13 from one point to another as illustrated in FIG. 8. The conveying portion 15 may be comprised of various materials, such as but not limited to metal, plastic or rubber. The conveying portion 15 is also mechanically attached to a chain link assembly 16 that circumscribes the inner side of the conveying portion 15 and provides a means to circulate the conveying portion 15 as illustrated in FIG. 7.

The chain link assembly 16 and support structure of the conveyor unit 12 associated with the circulation of the conveying portion 15 is preferably commonly associated or directly from Caterpillar machinery, wherein Caterpillar is a company that manufactures many devices including heavy duty equipment and may commonly be referred to as CAT. The chain link assembly 16 and connecting structure also preferably includes a plurality of carrier rollers, wherein the conveying portion 15 circulates upon the carrier rollers. The carrier rollers are preferably fluidly sealed to increase the longevity of the carrier rollers.

The use of Caterpillar machinery allows the various structure of the conveyor unit 12 to be easily replaced if need be, wherein parts for Caterpillar machinery are generally sold widely throughout many various stores and companies. The Caterpillar machinery utilized with the conveyor unit 12 is further preferably associated with Caterpillar D4, D5 or D6 models of Caterpillar machinery.

The conveyor unit 12 also includes a motor 18 to mechanically drive the chain link assembly 16 as illustrated in FIG. 8, wherein the motor 18 utilized with the present invention is preferably comprised of an electric motor 18 configuration. It is appreciated however that the motor 18 may operate upon various sources of energy, such as but not limited to gasoline or diesel fuel.

i. First Planetary Gear Structure

Figure 4:
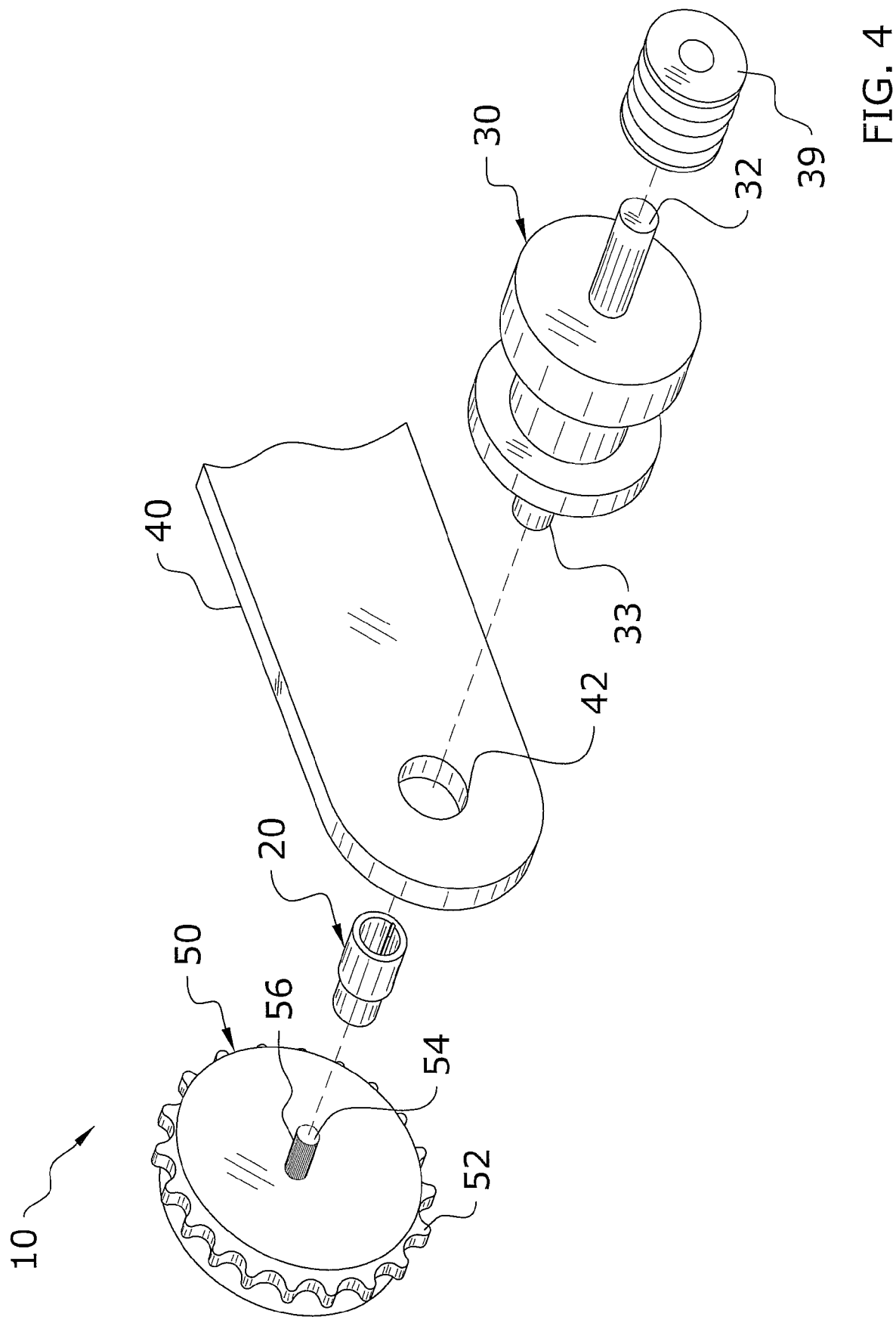
FIG. 4 is an upper perspective view of the present invention exploded from a first planetary gear structure and a second planetary gear structure.
Figure 5:
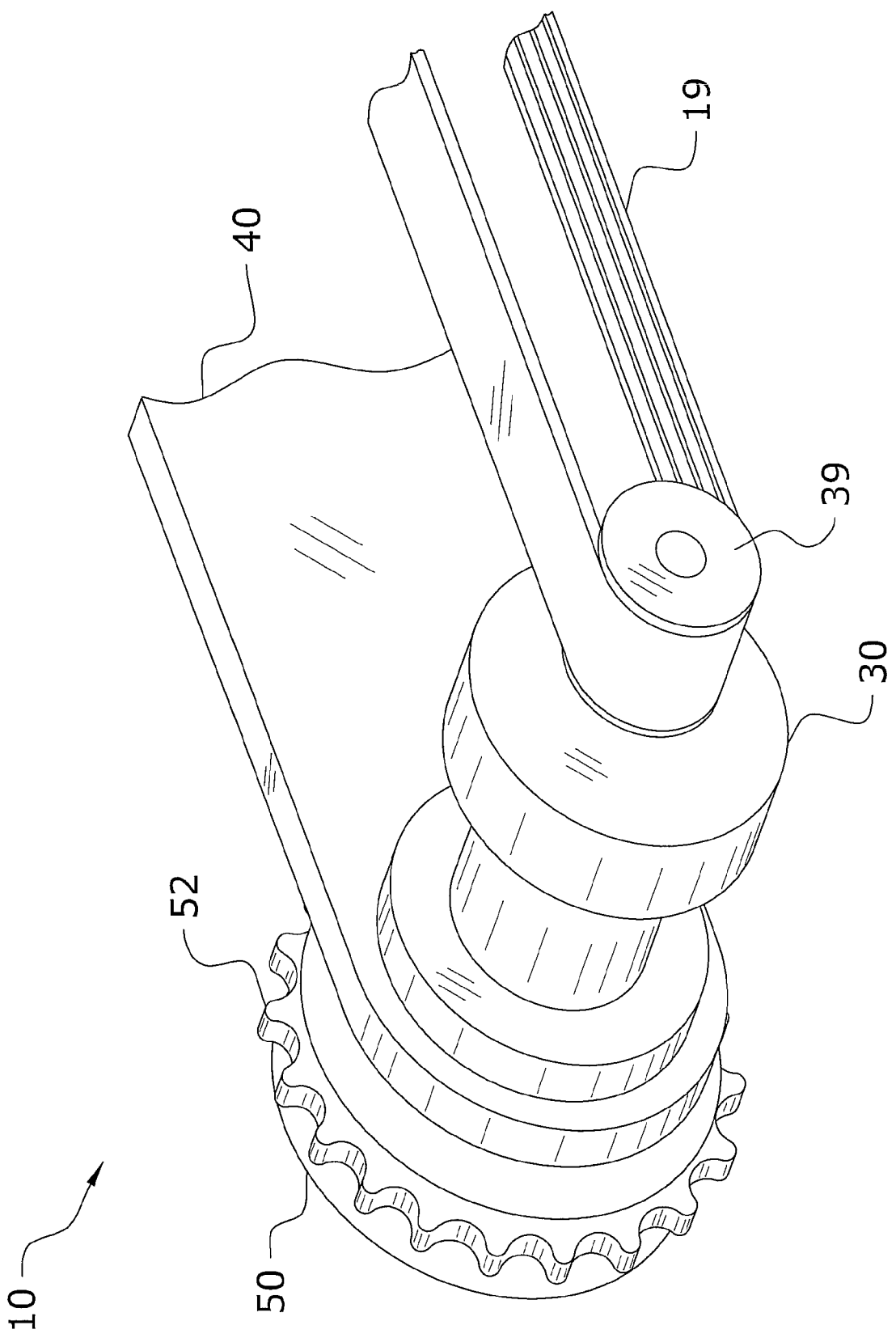
FIG. 5 is an upper perspective view of the present invention attached to the first planetary gear structure and the second planetary gear structure.

The conveyor unit 12 includes a first planetary gear structure 30 mechanically connected between the motor 18 via a belt 19 and the coupler 20 as illustrated in FIGS. 4, 5 and 8. The first planetary gear structure 30 also preferably includes a connecting member 39 to connect the first outer shaft 32 to the belt 19 as illustrated in FIG. 4. The first planetary gear structure 30 includes a plurality of gears to reduce an input to output revolutions per minute. The first planetary gear structure 30 is preferably comprised of a standard planetary gear structure common in the art. The first planetary gear structure 30 serves to substantially reduce the number of revolutions per minute from a first outer shaft 32 mechanically connected to the motor 18 to a first inner shaft 33 mechanically connected to the coupler 20.

It is appreciated that the revolutions per minute of the first outer shaft 32 is substantially less than the revolutions per minute of the first inner shaft 33. In the preferred embodiment of the present invention the first planetary gear structure 30 is comprised of a planetary gear structure manufactured by Sumitomo. The first planetary gear structure 30 is further comprised of common device that may be easily located within stores if the first planetary gear structure 30 ever needs to be replaced.

Figure 6:
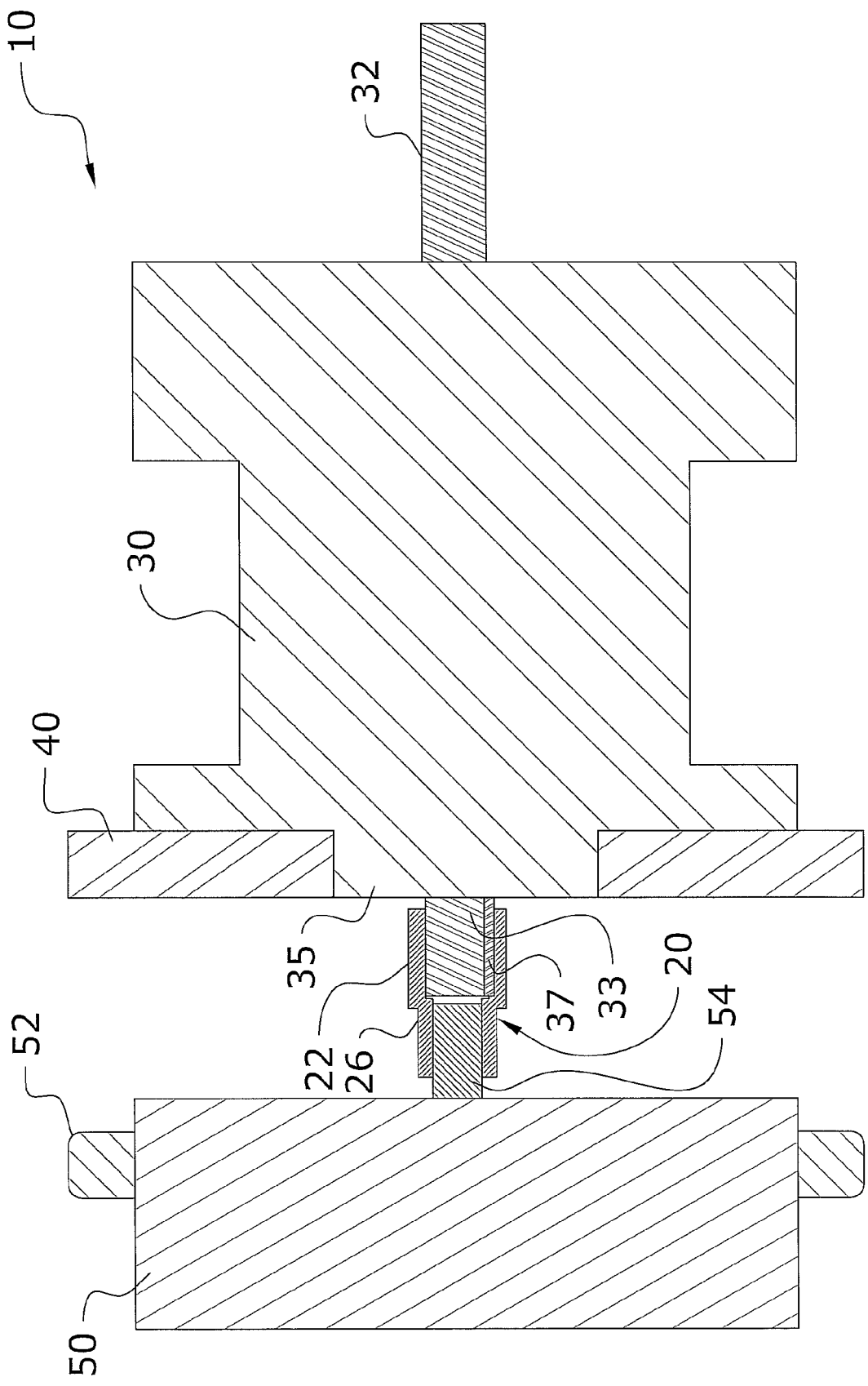
FIG. 6 is a longitudinal cross-sectional view of the present invention attached to the first planetary gear structure and the second planetary gear structure.

The first planetary gear structure 30 is also preferably fluidly sealed. The work associated with the transport of aggregate material 13 is commonly very dusty and dirty, wherein the fluidly sealed nature of the first planetary gear structure preferably increases the working lifetime of the first planetary gear structure 30. The first planetary gear structure 30 also includes a first extending portion 35 to be received by an aperture 42 of a support member 40 of the conveyor unit 12 as illustrated in FIGS. 4 and 6. The first extending portion 35 of the first planetary gear structure 30 preferably secures the first planetary gear structure 30 to the support member 40.

The first planetary gear structure 30 also includes a first attachment portion 37 extending along the first inner shaft 33 as illustrated in FIG. 6. The first attachment portion 37 preferably slides within the slot 24 of the first portion 22 to securely attach the first inner shaft 33 and thus first planetary gear structure 30 to the coupler 20. The first attachment portion 37 also prevents the first inner shaft 33 from freely rotating within the coupler 20.

ii. Second Planetary Gear Structure

The conveyor unit 12 also includes a second planetary gear structure 50 mechanically connected between the coupler 20 and the chain link assembly 16 as illustrated in FIGS. 4, 5 and 7. The second planetary gear structure 50 includes a plurality of gears to reduce an input to output revolutions per minute. The second planetary gear structure 50 is preferably comprised of a standard planetary gear structure commonly associated with Caterpillar machinery. The second planetary gear structure 50 is further preferably comprised of a Caterpillar planetary gear structure utilized in a Caterpillar D4, D5 or D6 model.

The second planetary gear structure 50 serves to substantially reduce the number of revolutions per minute from a second shaft 54 mechanically connected to the coupler 20 and the first inner shaft 33 to a plurality of outer gears 52 upon the second planetary gear structure 50. It is appreciated that the revolutions per minute of the outer gears 52 is substantially less than the revolutions per minute of the second shaft 54.

The second planetary gear structure 50 is further comprised of common device that may be easily located within stores if the second planetary gear structure 50 ever needs to be replaced. The second planetary gear structure 50 is also preferably fluidly sealed. It is desired that more or less planetary gear structures may be utilized with the present invention if the speed of the circulation of the conveying portion 15 of the conveyor unit 12 is desired to be substantially increased or decreased.

The second planetary gear structure 50 also includes a second attachment portion 56 extending along the second shaft 54, wherein the second attachment portion 56 is preferably comprised of a plurality of grooves equidistantly spaced about the second shaft 54. The second attachment portion 56 preferably slides about the ridge members 28 to securely attach the second shaft 54 and thus second planetary gear structure 50 to the coupler 20 as illustrated in FIGS. 4 and 6. The second attachment portion 56 also prevents the second shaft 54 from freely rotating within the coupler 20.

C. Coupler

The coupler 20 serves to mechanically connect the first planetary gear structure 30 to the second planetary gear structure 50 as illustrated in FIGS. 4 and 6. The coupler 20 is preferably comprised of a strong and durable material that may withstand heavy use and harsh weather conditions, such as but not limited to a strong metal or steel. However, it is appreciated that the coupler 20 may be comprised of various materials rather than the preferred embodiment.

The coupler 20 is also preferably small in size so as to keep the first planetary gear structure 30 closely connected to the second planetary gear structure 50 and thus further increase the strength of the connection between the first planetary gear structure 30 and the second planetary gear structure 50. The coupler 20 is further preferably comprised of a cylindrical configuration as illustrated in FIGS. 1, 2 and 4; however it is appreciated that the coupler 20 may be comprised of various configurations such as but not limited to rectangular.

Figure 2:
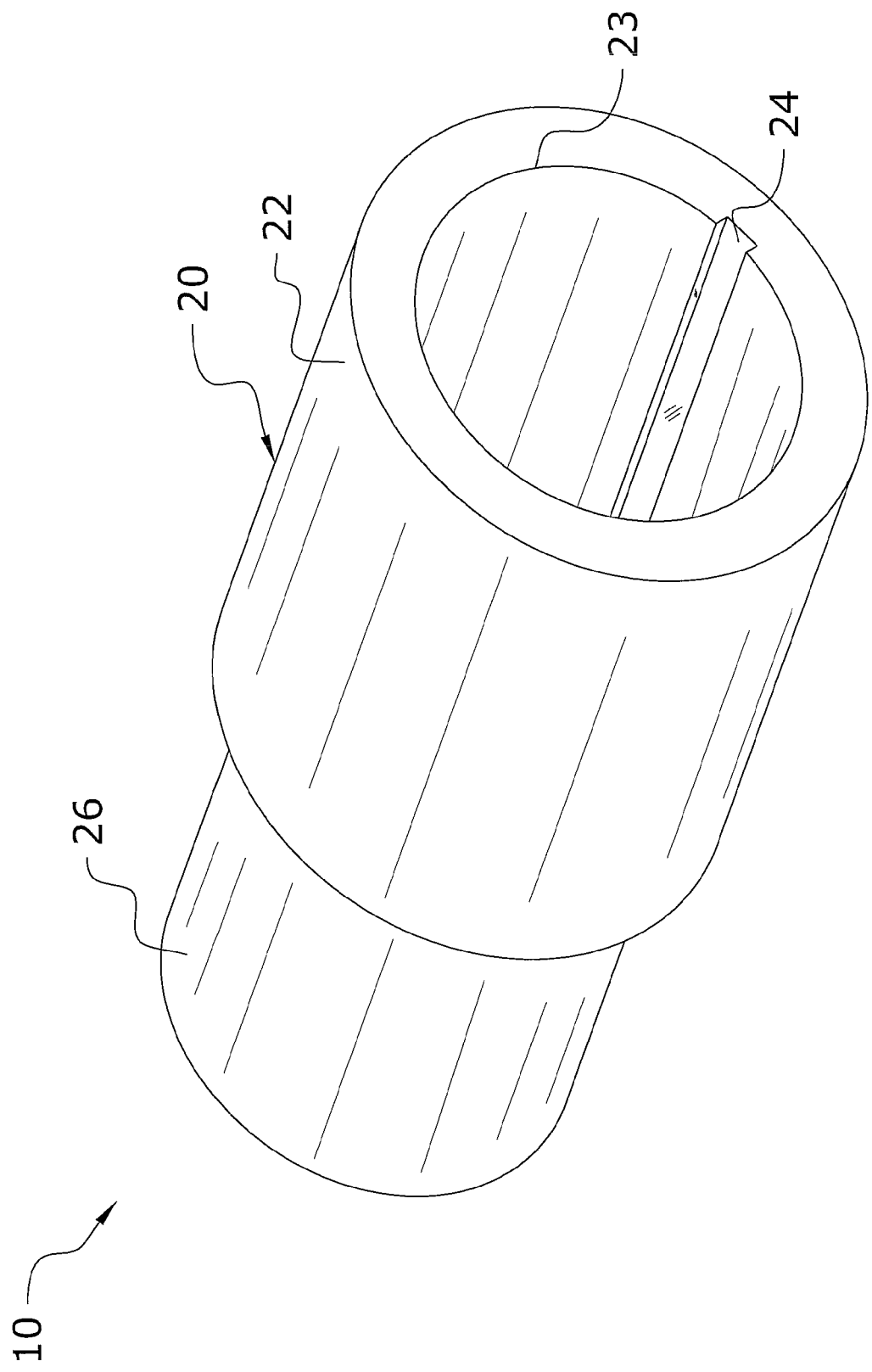
FIG. 2 is an upper perspective view of the present invention from a second direction.
Figure 3:
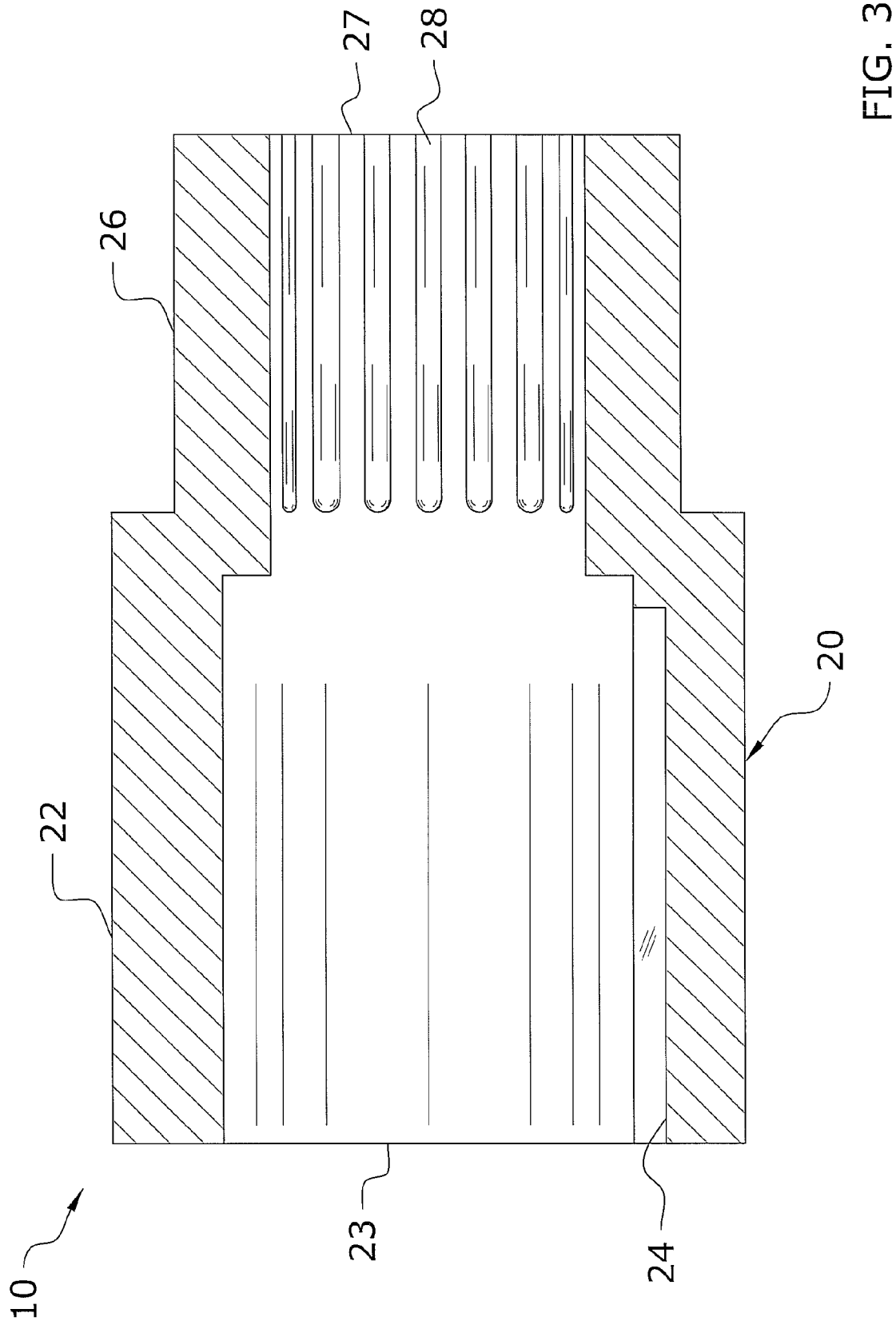
FIG. 3 is a longitudinal cross-sectional view of the present invention.

The coupler 20 is further comprised of a tubular configuration as illustrated in FIGS. 1 and 2. The tubular configuration of the coupler 20 allows the coupler 20 to receive the first inner shaft 33 of the first planetary gear structure 30 and the second shaft 54 of the second planetary gear structure 50, wherein the first inner shaft 33 and the second shaft 54 are received upon opposing ends of the coupler 20 as illustrated in FIGS. 3 and 6. It is appreciated however that the coupler 20 may be comprised of a solid structure, wherein the first inner shaft 33 of the first planetary gear structure and the second shaft 54 of the second planetary gear structure would be comprised of a tubular configuration.

i. First Portion

The first portion 22 of the coupler 20 is comprised of a cylindrical configuration. The first portion 22 includes a first opening 23 extending substantially through the first portion 22 as illustrated in FIGS. 2, 3 and 6. The first opening 23 preferably receives the first inner shaft 33 of the first planetary gear structure 30 as illustrated in FIGS. 4 and 6. A diameter of the first opening 23 is also substantially similar to the diameter of the first inner shaft 33 so as to provide a secure attachment between the first planetary gear structure 30 and the coupler 20. The first portion 22 includes the first connecting portion, wherein the first connecting portion includes the slot 24 and the first opening 23. The slot 24 extends within the first opening 23 and along a longitudinal axis of the first portion 22. The slot 24 is preferably comprised of an elongated rectangular configuration to slidably receive the first attachment portion 37 of the first inner shaft 33. The slot 24 is further preferably comprised of a keyway configuration as illustrated in FIGS. 2 through 4.

ii. Second Portion

The second portion 26 of the coupler 20 extends from the first portion 22. A longitudinal axis of the second portion 26 is also preferably substantially similar to a longitudinal axis of the first portion 22. The second portion 26 is also preferably concentric with the first portion 22 as illustrated in FIGS. 1 through 3. A diameter of the second portion 26 is also preferably less than the a diameter of the first portion 22; however it is appreciated that the diameters of the first portion 22 and the second portion 26 may vary accordingly to the diameters of the first inner shaft 33 of the first planetary gear structure 30 and the second shaft 54 of the second planetary gear structure 50.

The second portion 26 of the coupler 20 is comprised of a cylindrical configuration. The second portion 26 includes the second connecting portion, wherein the second connecting portion includes the plurality of ridge members 28 and the second opening 27. The second opening 27 extends substantially through the second portion 26 as illustrated in FIGS. 3 and 6. The second opening 27 preferably interconnects with the first opening 23. The second opening 27 preferably receives the second shaft 54 of the second planetary gear structure 50 as illustrated in FIGS. 4 and 6. The diameter of the second opening 27 is also substantially similar to the diameter of the second shaft 54 so as to provide a secure attachment between the second planetary gear structure 50 and the coupler 20.

The second portion 26 also includes a plurality of ridge members 28 extending within the opening and around a diameter of the second opening 27 as illustrated in FIG. 1. The plurality of ridge members 28 further preferably extend toward a center of the opening. The plurality of ridge members 28 are further preferably comprised of an elongated configuration to slidably receive the second attachment portion 56 of the second shaft 54. The plurality of ridge members 28 are also preferably equidistantly spaced about the opening. The plurality of ridge members 28 are further preferably parallel to the longitudinal axis of the second portion 26.

In the preferred embodiment of the present invention the plurality of ridge members 28 are comprised of a spline configuration as illustrated in FIG. 1, wherein the spline configuration is commonly associated with connecting shafts utilized to transmit torque. The plurality of ridge members 28 may be comprised of various widths to surround the opening, such as but not limited to a 34 spline configuration to attach to a Caterpillar D4 model planetary gear structure or a 36 spline configuration to attach to a Caterpillar D6 model planetary gear structure.

D. In Use

In use, the motor 18 is first started, wherein the motor 18 circulates the belt 19, which in turn rotates the first outer shaft 32 of the first planetary gear structure 30. The first planetary gear structure 30 then reduces the current revolutions per minute of the first outer shaft 32 through a plurality of reduction gears and outputs a reduced revolutions per minute upon the first inner shaft 33. The first inner shaft 33 then transfers the new current revolutions per minute to the second shaft 54 via the coupler 20.

The second planetary gear structure 50 then reduces the new current revolutions per minute of the second shaft 54 through a plurality of reduction gears and outputs a new reduced revolutions per minute upon the outer gears 52. The outer gears 52 then transfer the new reduced revolutions per minute to the chain link assembly 16 which is mechanically connected to the conveying portion 15 of the conveyor unit 12, wherein the conveying portion 15 is then able to transport the aggregate material 13 from one point to another at a consistent and efficient speed.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A conveyor coupler system, comprising:
   a coupler including a first portion and a second portion, wherein said first portion extends from said second portion;
   wherein said first portion includes a first connecting portion, wherein said first connecting portion extends within said first portion and wherein said first connecting portion includes at least one slot, wherein said first connecting portion includes a first opening, wherein said at least one slot extends within said first opening, wherein said at least one slot extends along a longitudinal axis of said first portion;
   wherein said second portion includes a second connecting portion, wherein said second connecting portion extends within said second portion and wherein said second connecting portion includes a plurality of ridge members;
   a first planetary gear structure connected within said at least one slot of said first connecting portion; and
   a second planetary gear structure connected to said plurality of ridge members of said second connecting portion, wherein said second planetary gear structure mechanically circulates a conveying portion of a conveyor unit.

2. The conveyor coupler system of claim 1, wherein said first connecting portion is concentric with said second connecting portion.

3. The conveyor coupler system of claim 1, wherein said second connecting portion includes a second opening.

4. The conveyor coupler system of claim 3, wherein said plurality of ridge members are equidistantly spaced around said second opening.

5. The conveyor coupler system of claim 3, wherein said plurality of ridge members extend within said opening.

6. The conveyor coupler system of claim 4, wherein said plurality of ridge members are comprised of a spline configuration.

7. The conveyor coupler system of claim 6, wherein said plurality of ridge members are comprised of a 34 spline configuration.

8. The conveyor coupler system of claim 6, wherein said plurality of ridge members are comprised of a 36 spline configuration.

9. The conveyor coupler system of claim 1, wherein said first planetary gear structure is mechanically connected to a motor, wherein said motor drives said first planetary gear structure.

10. The conveyor coupler system of claim 1, wherein said coupler is comprised of a tubular structure.

11. The conveyor coupler system of claim 1, wherein said at least one slot is parallel to said plurality of ridge members.

12. A conveyor coupler system, comprising:
    a coupler including a first portion and a second portion, wherein said first portion extends from said second portion;
    wherein said first portion includes a first connecting portion and wherein said second portion includes a second connecting portion, wherein said first connecting portion includes a first opening, wherein said first connecting portion includes at least one slot, wherein said at least one slot extends within said first opening, wherein said at least one slot extends along a longitudinal axis of said first portion, wherein said second connecting portion includes a plurality of ridge members;
    a first planetary gear structure, wherein said first planetary gear structure mechanically connects to said first connecting portion of said first portion;
    a second planetary gear structure, wherein said second planetary gear structure mechanically connects to said second connecting portion of said second portion;
    a motor mechanically connected to said first planetary gear structure; and
    a conveying portion of a conveyor unit mechanically connected to said second planetary gear structure.

13. The conveyor coupler system of claim 12, wherein said first planetary gear structure connects within said at least one slot of said first connecting portion.

14. The conveyor coupler system of claim 12, wherein said second planetary gear structure is connected to said plurality of ridge members of said second connecting portion.

15. The conveyor coupler system of claim 12, wherein said first planetary gear structure connects within said at least one slot of said first connecting portion and wherein said second planetary gear structure is connected to said plurality of ridge members of said second connecting portion.

16. A conveyor coupler system, comprising:
    a coupler including a first portion and a second portion, wherein said first portion extends from said second portion;
    wherein said first portion includes a first connecting portion, wherein said first connecting portion extends within said first portion and wherein said first connecting portion includes at least one slot;
    wherein said second portion includes a second connecting portion, wherein said second connecting portion extends within said second portion and wherein said second connecting portion includes a plurality of ridge members;
    wherein said first connecting portion includes a first opening, wherein said at least one slot extends within said first opening, wherein said at least one slot extends along a longitudinal axis of said first portion;
    wherein said first connecting portion is concentric with said second connecting portion;
    wherein said second connecting portion includes a second opening and wherein said plurality of ridge members are equidistantly spaced around said second opening;
    wherein said plurality of ridge members extend within said opening;
    wherein said plurality of ridge members are comprised of a spline configuration;
    a first planetary gear structure, wherein said first planetary gear structure mechanically connects to said first connecting portion of said first portion;
    wherein said first planetary gear structure is mechanically connected to a motor, wherein said motor drives said first planetary gear structure; and
    a second planetary gear structure, wherein said second planetary gear structure mechanically connects to said second connecting portion of said second portion;
    wherein said second planetary gear structure mechanically circulates a conveying portion of a conveyor unit;
    wherein said second planetary gear structure is comprised of a planetary gear mechanism.

* * * * *